United States Patent [19]
Cheng

[11] Patent Number: 6,102,432
[45] Date of Patent: Aug. 15, 2000

[54] DIRECTION CHANGING DEVICE FOR A HANDLE OF A STROLLER

[75] Inventor: Pao-Hsien Cheng, No. 139, Jen Yi 1st Street, Jen Te Hsiang, Tainan Hsien, Taiwan

[73] Assignee: Pao-Hsien Cheng, Tainan Hsien

[21] Appl. No.: 09/252,094

[22] Filed: Feb. 18, 1999

[51] Int. Cl.[7] .................................. B62B 7/08; B62D 9/20
[52] U.S. Cl. .................. 280/642; 280/47.36; 280/47.371
[58] Field of Search .................................. 280/642, 647, 280/650, 658, 47.36, 47.371, 47.38; 403/102, 325, 315, 327, 316

[56] References Cited

U.S. PATENT DOCUMENTS

| | | | |
|---|---|---|---|
| 5,056,805 | 10/1991 | Wang | 280/47.36 |
| 5,257,799 | 11/1993 | Cone et al. | 280/642 |
| 5,513,864 | 5/1996 | Huang | 280/47.36 |
| 5,674,165 | 10/1997 | Cohen et al. | 482/127 |
| 5,845,924 | 12/1998 | Huang | 280/642 |
| 5,871,227 | 2/1999 | Huang | 280/642 |

*Primary Examiner*—Brian L. Johnson
*Assistant Examiner*—Bridget Avery
*Attorney, Agent, or Firm*—Rosenberg, Klein & Lee

[57] ABSTRACT

A direction changing device for a handle of a stroller comprises a main body, a pulling rod and a co-moving part; the handle is fixed to the main body, which is capable of pivoting on a fixing element of a support member of the stroller. The main body has a hollow, in which the co-moving part is movably received. The pulling rod has a hooked end engaging a slope of the co-moving part. The co-moving part has two concavities each communicating with a confining end of the hollow to form two locating holes for a locating pole of the support member to be passed thereinto. The locating pole engages either one of the concavities to prevent the main body from turning. When the pulling rod is pulled, the co-moving part will be moved further into the hollow for releasing the concavities from the engagement with the locating pole. Thus, the main body plus the handle can be pivoted to change direction of the handle.

1 Claim, 9 Drawing Sheets

DIRECTION CHANGING DEVICE FOR A HANDLE OF A STROLLER

BACKGROUND OF THE INVENTION

In order for the parent to be able to watch the baby lying on a stroller when he/she pushes the stroller or for the baby to see his/her parent such that it can feel secure, strollers, of which the pushing handle can be turned to be located in various directions, have been developed and used for a long time.

Figure 8:
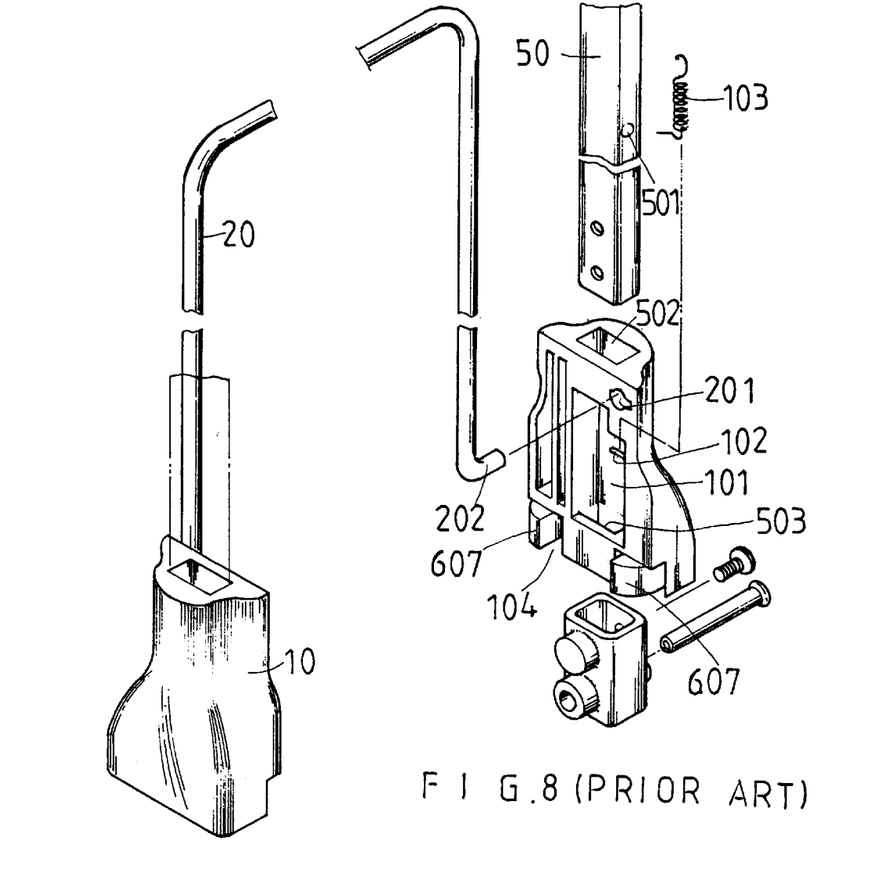
FIG. 8 is an exploded perspective view of the prior art direction changing device as described in the Background.
Figure 9:
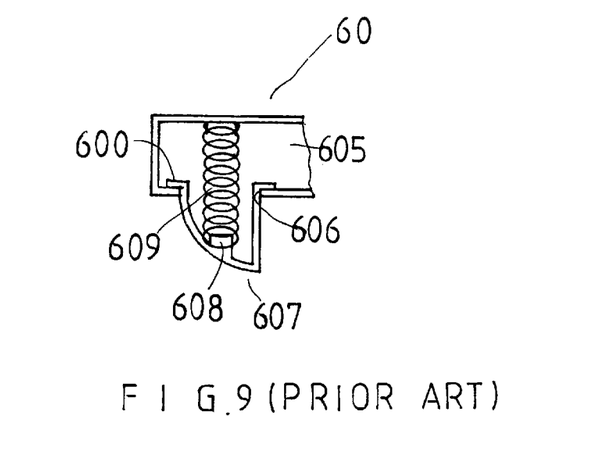
FIG. 9 is a fragmentary and enlarged view of an engaging device of the prior art device.
Figure 10:
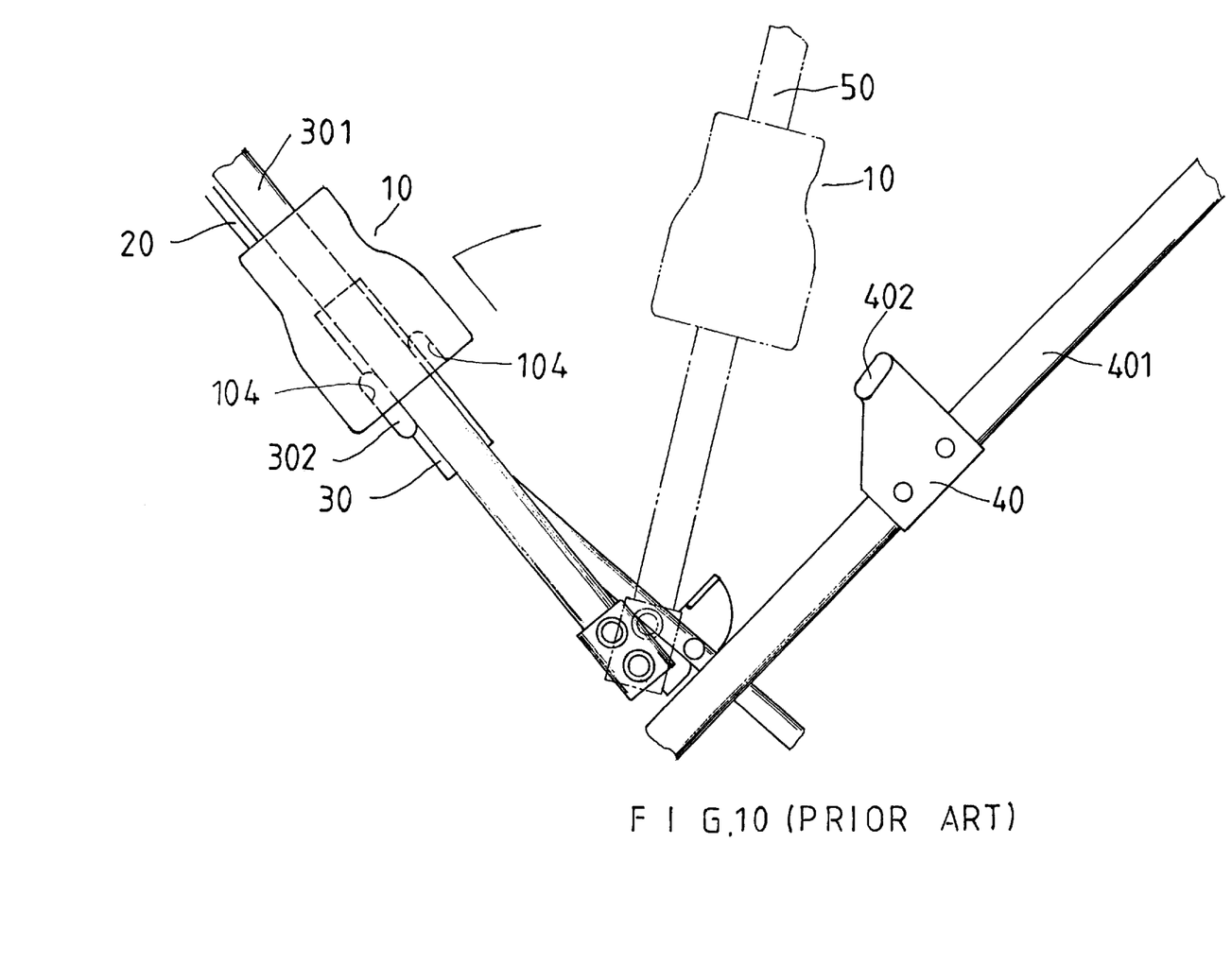
FIG. 10 is a view showing the prior art device of FIG. 8 under direction changing movement.

Referring to FIGS. 8, 9 and 10, a heretofore known direction changing device for a stroller pushing handle, comprises an inverted U-shaped pulling rod 20, two engaging blocks 10, two engaging devices 60, a front locating block 40 and a rear locating block 30 as main parts. The locating blocks 40,30 having protrusions 402, 302 are respectively fixed to the support frames 401, 301 of the stroller.

The engaging blocks 10 each has a hole 502, an engaging gap 201, a hollow 101, a lower hollow 503 and a protrusion 102. Two ends of a pushing handle 50 are each passed into the hole 502, the hollow 101 and the lower hollow 503 of the respective engaging block 10, and biasd by a spring 103 connected to both a round hole 501 of same and the corresponding protrusion 102.

The inverted U-shaped pulling rod 20 has two bent ends 202; the bent ends 202 are each passed into the engaging gap 201 of the respective engaging block 10.

Each of the engaging blocks 10 is provided with an engaging device 60 at lower end portion thereof. The engaging devices 60 each has a hollow holding member 605 having two openings 606 each engaging a respective engaging part 607; the engaging parts 607 each has two bent ends 600 for preventing same from falling out of the holding member 605. The engaging parts 607 each has a curved side, a flat side and a protrusion 608. A spring 609 is located between the holding member 605 and the engaging part 607 by the protrusion 608. Thus, the engaging devices 60 can resiliently engaging either the protrusion 402 of the front locating block 40 or the protrusion 302 of the rear locating block 30 at a recess 104 of the engaging block 10 after changing the direction of the pushing handle of the stroller.

However, it is found that the direction changing device for a pushing handle has undesirable features as follows.

1. In assembling the stroller, the manufacturer has to fit the front and rear locating blocks 40,30 at the exact position in order for the engaging device to be capable of engaging therewith after user's changing direction of the pushing handle, making the assembling very inconvenient.
2. The parts of the direction changing device are relatively numerous, making the manufacturing and assembling costly and time-consuming.

SUMMARY

It is a main object of the present invention to provide a direction changing device for a handle of a stroller, which has relatively simple structure and takes less time in manufacturing and assembling than the prior art one.

The direction changing device comprises:

a main body pivoted on a fixing element of the support member;

a locating pole formed on the support member;

a pulling rod; and, a co-moving part movably received within a hollow of the main body; the co-moving part has two concavities at two ends, each of which is arranged adjacent to a respective confining end of the hollow of the main body to form a respective locating hole therebetween; the locating pole is received in either one of the locating holes such that the main body can not turn due to the engagement of the locating pole with the end concavities; the pulling rod has hooked end engaging a sloped plate of the co-moving part such that the hooked end, when the pulling rod is pulled upwards, will force the co-moving part to move, causing the end concavities to separate from, and no longer engage, the locating pole; thus, the main body plus the co-moving part can be turned for changing the direction of the pushing handle connected to the main body; springs are provided to the pulling rod and the co-moving part such that the pulling rod can be biased downwards to original position after releasing the pulling force, and the co-moving part can be biased to original position for the other end concavity to engage the locating pole for fixing the pushing handle after changing the direction thereof.

BRIEF DESCRIPTION OF THE DRAWINGS

The present invention will be better understood by reference to the accompanying drawings, wherein.

DETAILED DESCRIPTION OF THE PRESENT INVENTION

Figure 1:
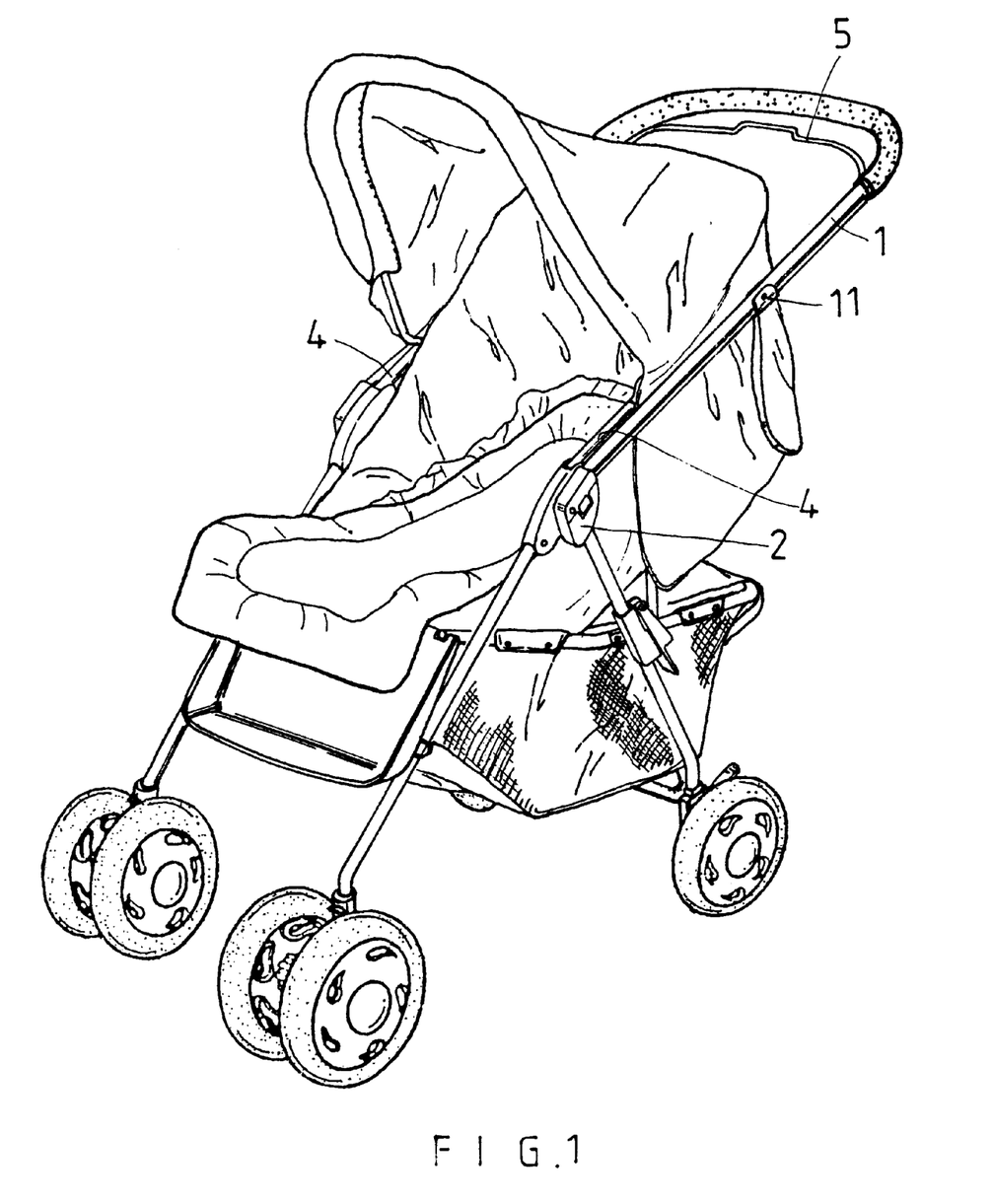
FIG. 1 is a view showing a stroller with a direction changing device for a handle according to the present invention.
Figure 2:
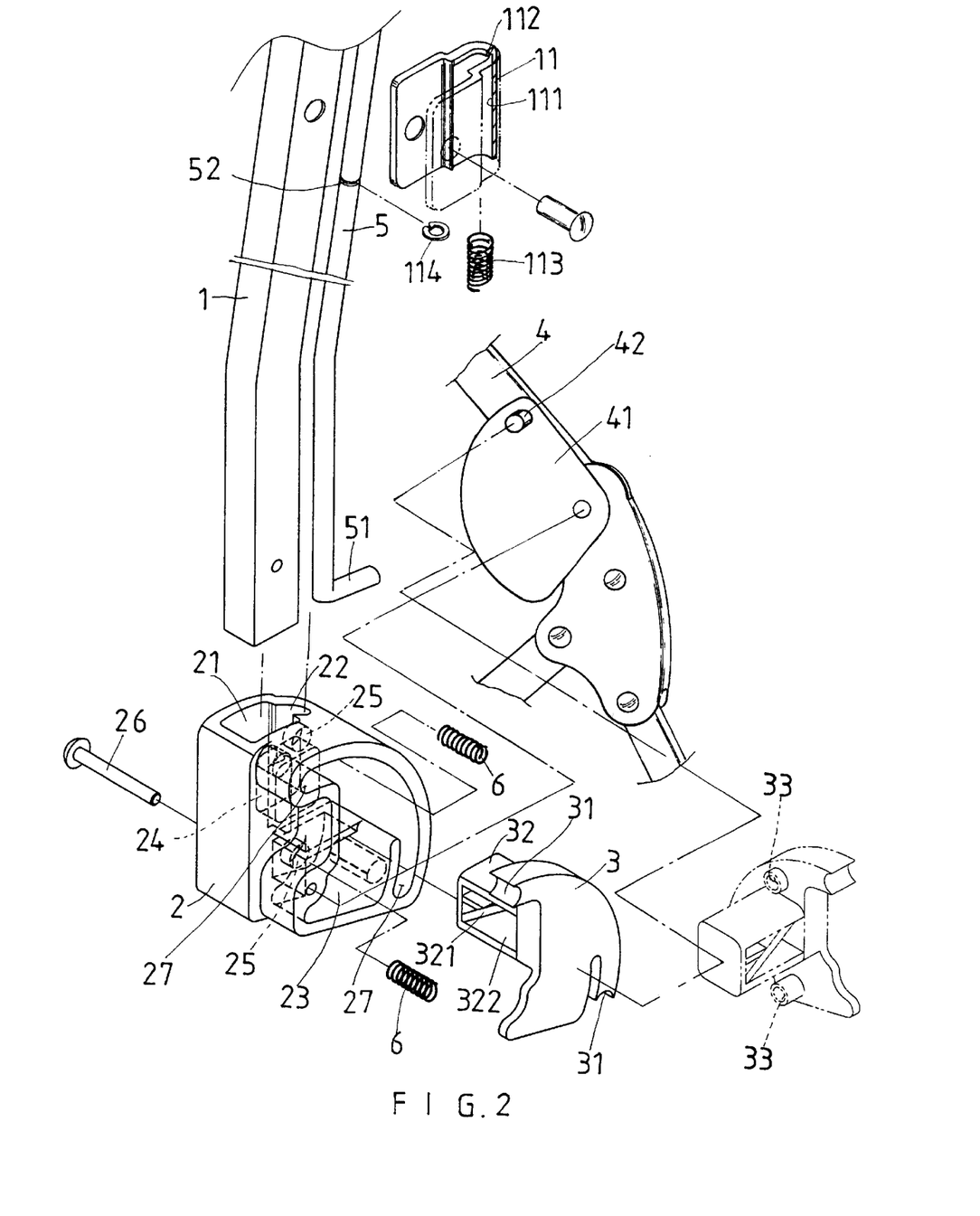
FIG. 2 is an exploded perspective view of the direction changing device for a handle according to the present invention.

A direction changing device for a handle of the present invention, referring to FIGS. 1 and 2, is fitted to a pushing handle 1 of the stroller, and comprises a main body 2, a co-moving part 3 and a pulling rod 5 as main parts.

The pulling rod 5 has a hooked end 51 at lower end and an annular recess 52 on an intermediate portion thereof. A C-shaped ring 114 is connected to the annular recess 52. The pulling rod 5 is connected to the pushing handle 1 by means of a connecting member 11; the connecting member 11 is fixed to the pushing handle 1. The connecting member 11 has a holding room 111, which holds the pulling rod 5. A confining protrusion 112 is provided on upper portion of the connecting member 11. A spring 113 is inserted by the pulling rod 5, and confined between the confining protrusion 112 and the C-shaped ring 114 such that the spring 113 can bias the pulling rod 5 downwardly.

The main body 2 has a holding hole 21 and a holding room 22 communicating with the holding hole 21. The pushing handle 1 and the pushing rod 5 are inserted into the holding hole 21 and the holding room 22 respectively. The main body 2 further has a through hole 24, a hollow 23, two confining ends 27 and a plurality of holes 25.

The co-moving part 3 is movably received within the hollow of the main body 2. The co-moving part 3 has a protruding part 32, which is inserted into the through hole 24 of the main body 2. A plurality of protrusions 33 are provided, each fitted into a corresponding one of the holes 25 of the main body 2 with a respective spring 6 located therebetween. The co-moving part 3 further has a hollow 322 inside the protruding part 32. A sloped plate 321 is provided within the hollow 322.

The hooked end 51 of the pulling rod 5, after having been passed into the holding room 22 of the main body 2, is received in the hollow 322 of the co-moving part 3 under the sloped plate 321.

Moreover, two concavities 31 are provided on the co-moving part 3, as shown in FIG. 2. The concavities 31 each communicates with a corresponding one of the confining ends 27 of the hollow 23 of the main body 2 such that locating holes 34,35 are formed therebetween as shown in FIG. 3.

Thus, the co-moving part 3 is biased by the springs 6 in a direction toward open end of the hollow 23 of the main body 2. The hooked end 51 of the pulling rod 5 will force the co-moving part 3 to move in a direction opposite the open end of the hollow 23 by means of the connection between same and the sloped plate 321 of the co-moving part 3 when the pulling rod 5 is pulled upwards.

Figure 3:
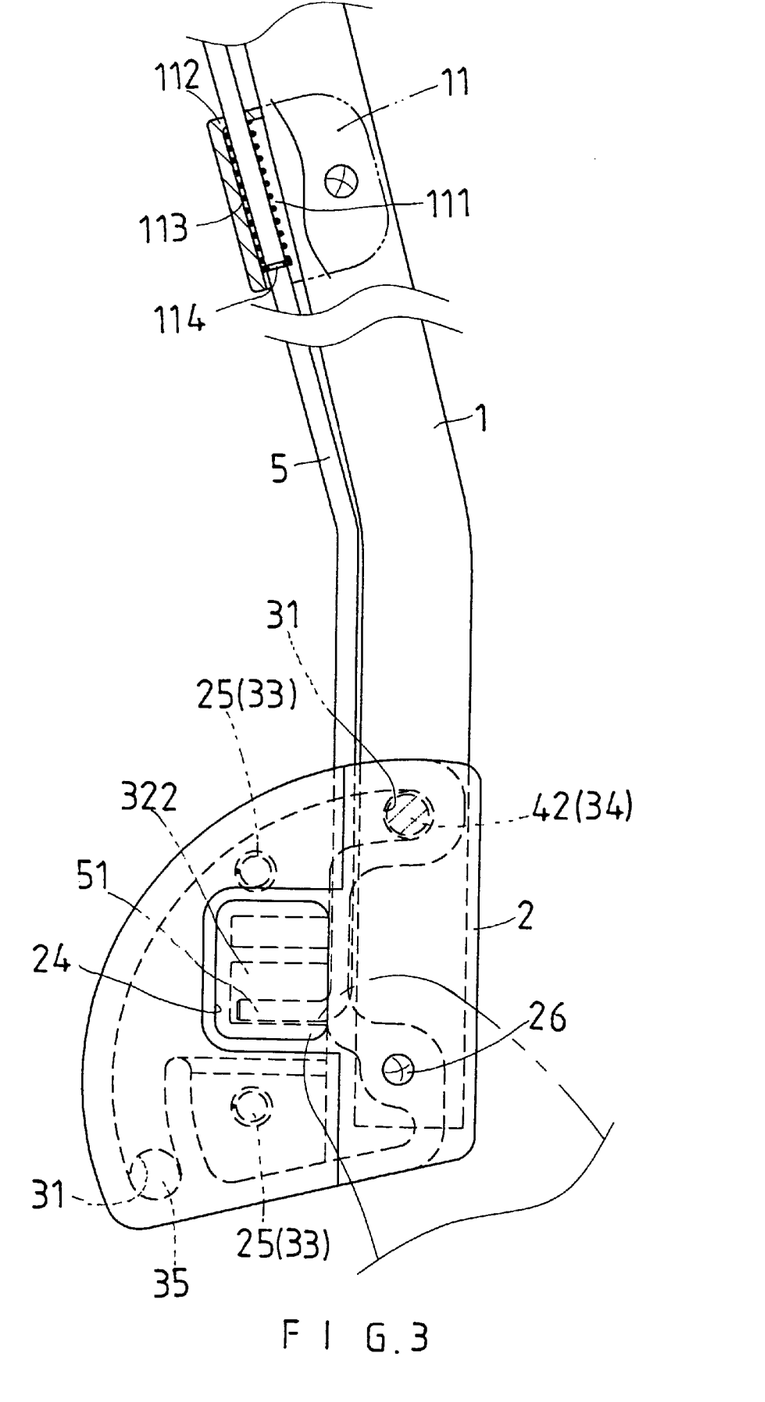
FIG. 3 is a sectional view of the direction changing device for a handle of FIG. 2.

Referring to FIGS. 1 and 3, the main body 2, combined with the co-moving part 3, is pivoted to an upper support member 4 of the stroller by means of a fixing element 26. Referring to FIG. 2, the upper support member 4 has a locating plate 41 and a locating pole 42; the locating plate 41 confines the co-moving part 3; the locating pole 42 is received in either one of the locating holes 34,35 defined by the main body 2 and the co-moving part 3. Thus, when the co-moving part 3 is forced to move further into the hollow 23 of the main body 2, the locating pole 42 of the upper support member 4 no longer engages the locating hole 34 or 35, permitting the main body 2 to be pivoted on the fixing element 26.

Figure 4:
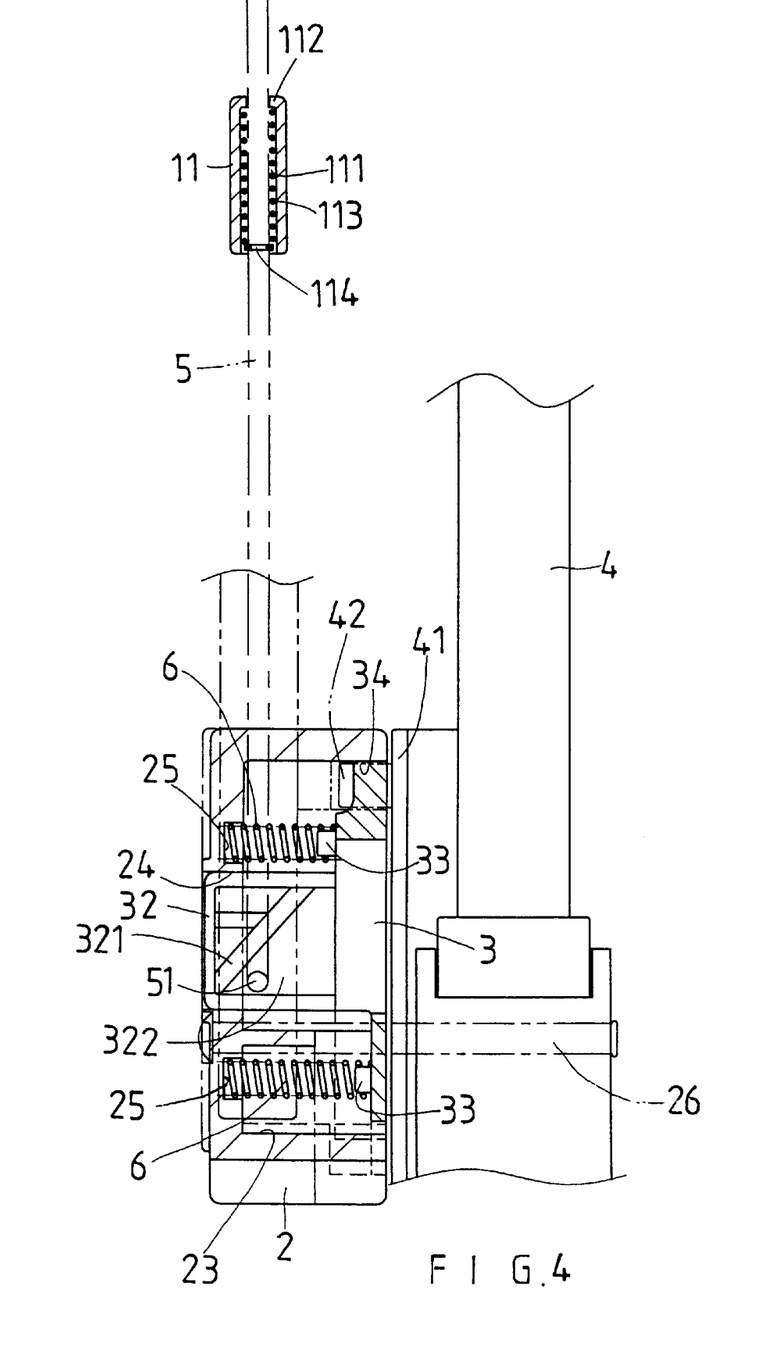
FIG. 4 is another sectional view of the direction changing device for a handle of FIG. 2.

In assembling the direction changing device of the stroller handle, referring to FIGS. 3 and 4, firstly the co-moving part 3 is fitted to the main body 2 with the springs 6 arranged in position. Secondly, the fixing element 26 is used to pivot the main body 2 on the locating plate 41 with the locating pole 42 of the locating plate 41 received in the locating hole 34 or 35. Next, the pulling rod 5 is passed into the holding room 22 of the main body 2 with the hooked ends 51 positioned under the sloped plate 321 in the hollow 322 of the co-moving part 3. Finally, the pushing handle 1 is passed into the holding hole 21 of the main body 2 from two ends thereof; and, the connecting member 11 is connected to both the pushing handle 1 and the pulling rod 5 as described above.

Figure 5:
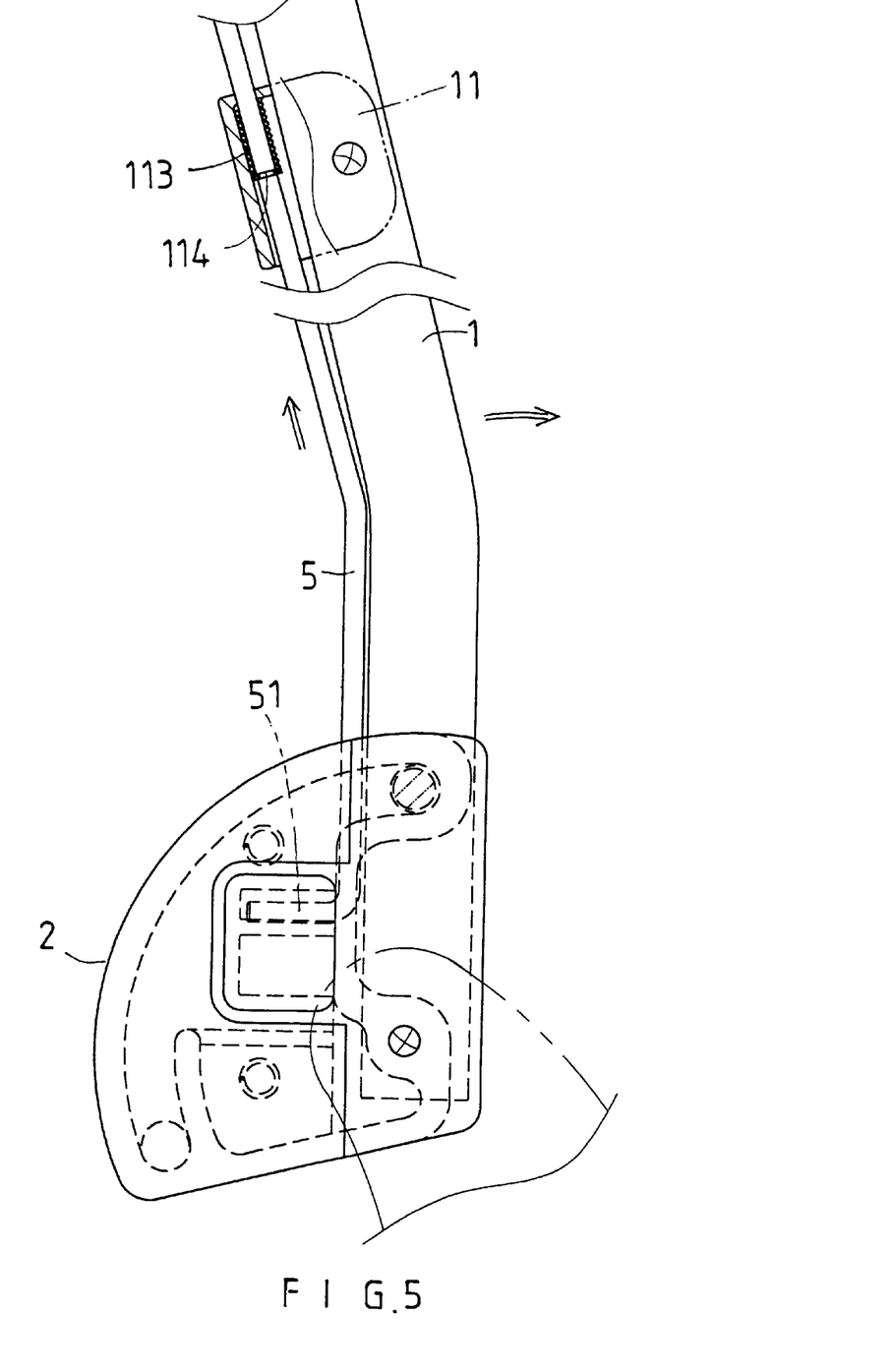
FIG. 5 is a view showing the direction changing device for a handle under the direction changing movement of the present invention.
Figure 6:
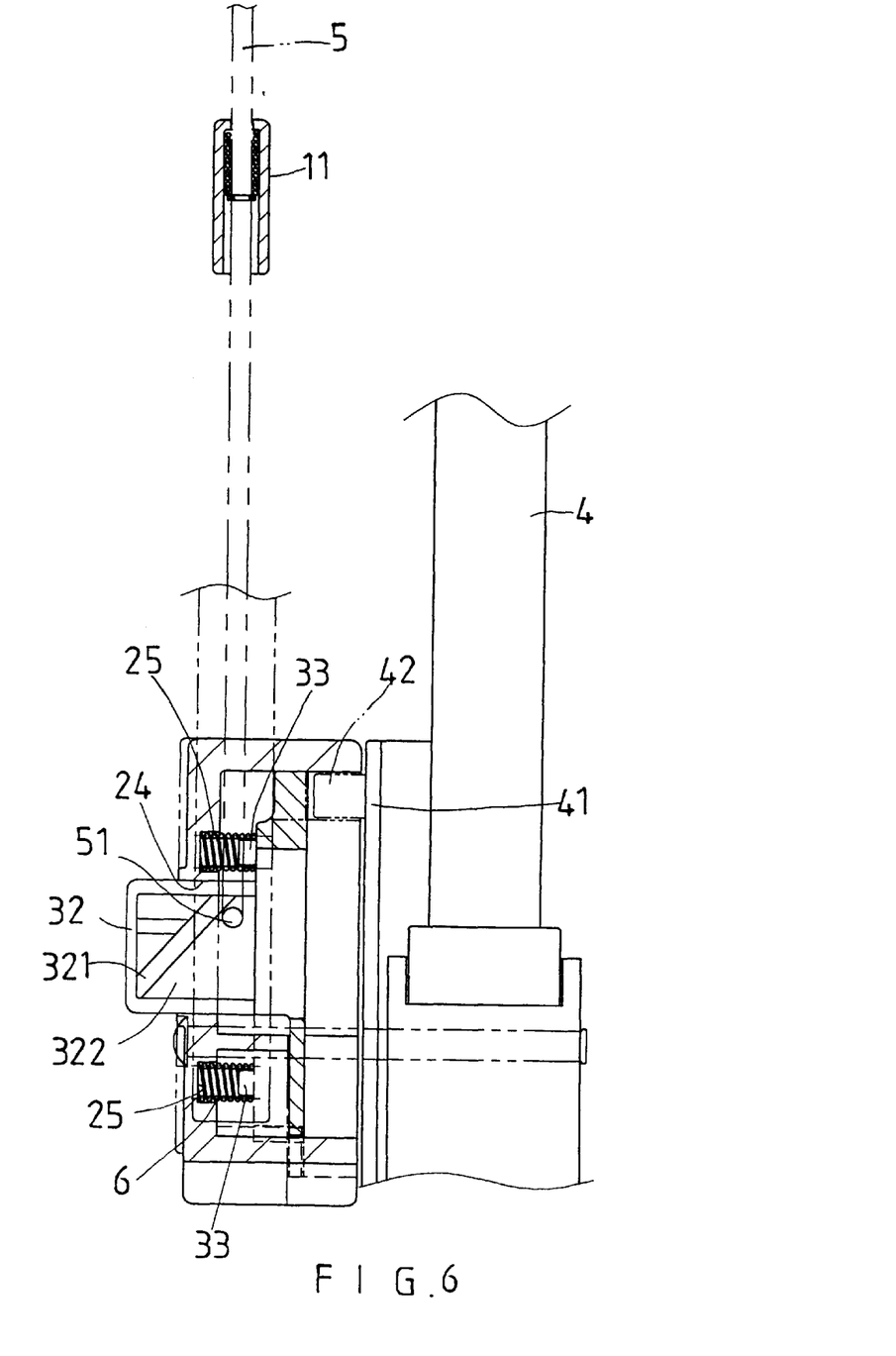
FIG. 6 is a second view showing the direction changing device for a handle under the direction changing movement of the present invention.
Figure 7:
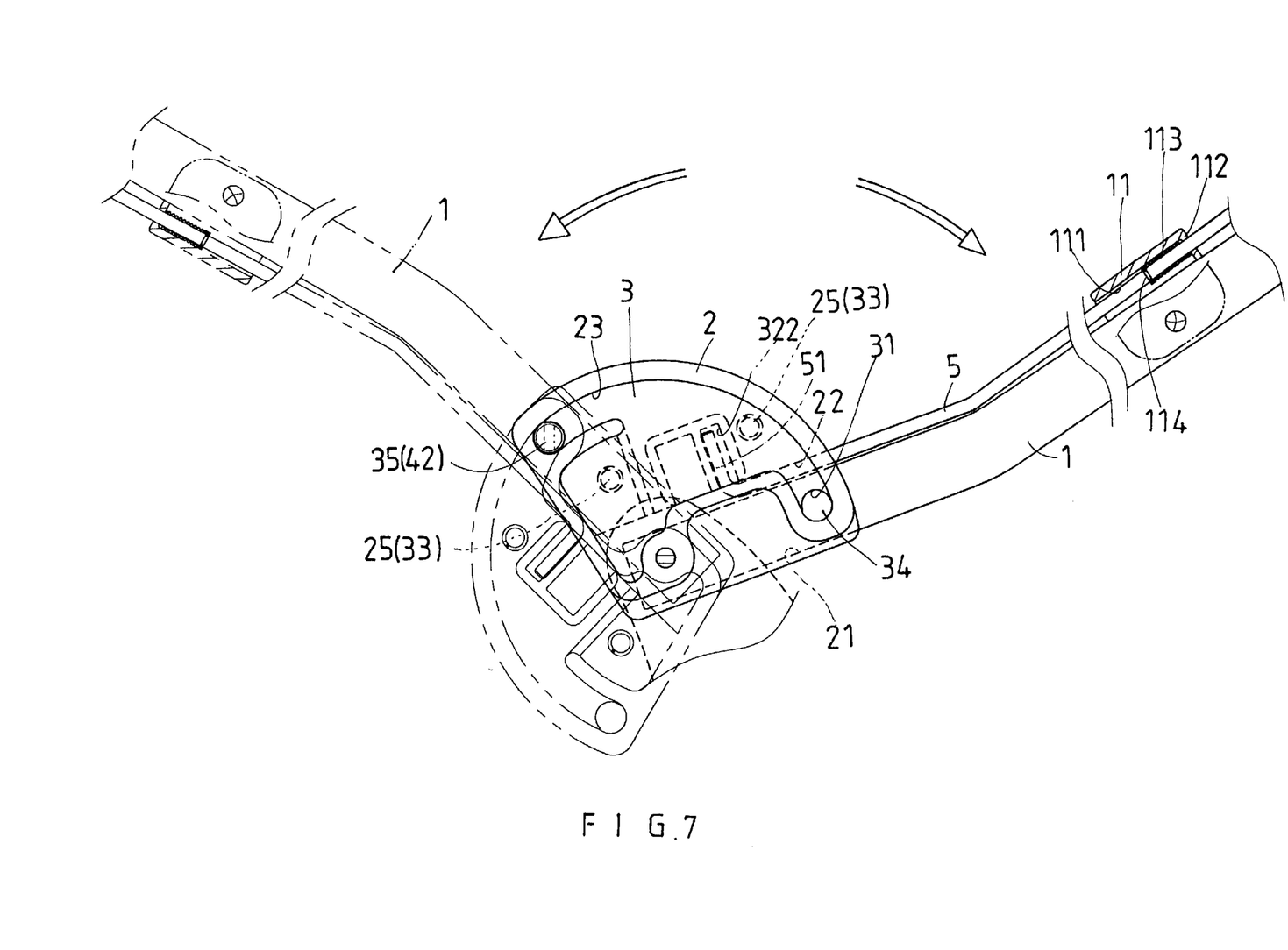
FIG. 7 is a third view showing the direction changing device for a handle under the direction changing movement of the present invention.

In changing the direction of the pushing handle 1, referring to FIGS. 5, 6 and 7, firstly the pulling rod 5 is pulled upwards such that the hooked ends 51 force the co-moving part 3 to move further into the hollow 23 of the main body 2. Thus, the locating pole 42 of the upper support member 4 no longer engages the concavity 31 of the co-moving part 3. Then, in changing the direction of the handle 1, the pushing handle 1 is pushed to pivot on the fixing element 26 along with the main body 2 for the other one of the concavities 31 to move close to the locating pole 42. Thus, the locating pole 42 engages the last concavity 31 to fix the main body 2 and the pushing handle 1 in position when the pulling rod 5 is released, the spring 113 biasing the pulling rod 5 downwardly, the springs 6 forcing the co-moving part 3 to move in the direction toward the open end of the hollow 23 of the main body 2.

From the above description, it can be understood that the direction changing device for stroller handle of the present invention has desirable features as follows.

1. Being provided on the locating plate which is fixed, the locating pole can always help the pushing handle to be located in position very efficiently and conveniently.
2. Consisting of the main body and the co-moving part, the direction changing device has relatively simple structure. Consequently, time for assembly same is shortened.

What is claimed is:

1. A direction changing device for a handle of a stroller, comprising a main body pivoted on an upper support member of said stroller by a fixing element; said upper support member having a locating plate and a locating pole on said locating plate; said main body having a through hole, a hollow, a holding hole and a holding room in open communication with said holding hole, said through hole being in open communication with both said holding hole and said hollow, a co-moving part having a protruding part and first and second concavities, said co-moving part being movably received within said hollow of said main body with said protruding part extending into said through hole of said main body, a plurality of springs positioned between said main body and said co-moving part for biasing said co-moving part toward an open side of said hollow, said hollow having a first confining end and a second confining end, said first and second concavities positioned on opposite ends of said co-moving part forming first and second locating holes with said first and second confining ends respectively, said co-moving part having a hollow inside said protruding part, and a sloped plate in said hollow, a pulling rod is positioned in said holding room, said pulling rod having a hooked end received within said hollow of said co-moving part, said hooked end engaging said sloped plate, and being capable of forcing said co-moving part to move further into said hollow of said main body on upward movement thereof, said handle being fixedly positioned within said holding hole of said main body, said pulling rod being biased downwardly by a spring, said locating pole being received within said hollow of said main body and being capable of engaging either one of said first and second concavities of said co-moving part for preventing said main body from pivoting on said fixing element, said main body plus said handle being capable of pivoting on said fixing element allowing said locating pole to be housed in said hollow thereof between said first and second confining ends when said co-moving part is forced to move further into said hollow of said main body and said concavities no longer engages said locating pole on said upward movement of said pulling rod, said springs being positioned between said main body and said co-moving part and being capable of biasing said co-moving part toward said open side of said hollow for said concavities to engage said locating pole on releasing said pulling rod from said upward movement after said pivoting of said main body.

* * * * *